G. W. GIBSON.
ANIMAL-TRAP.
No. 184,772.  Patented Nov. 28, 1876.
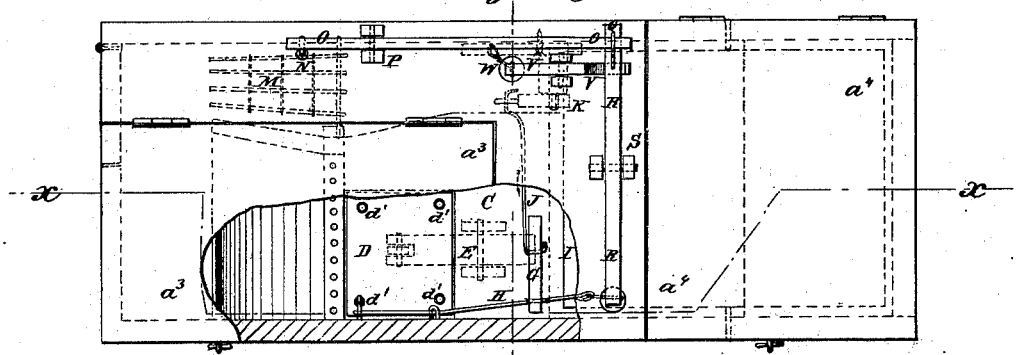
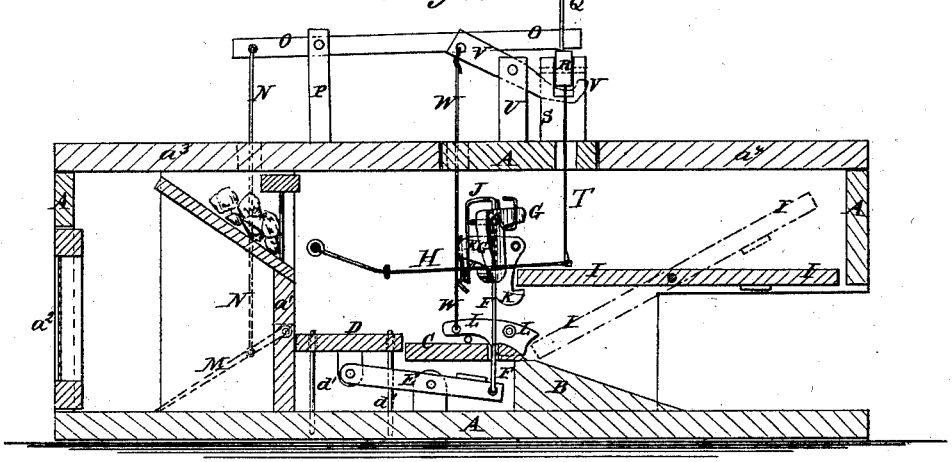
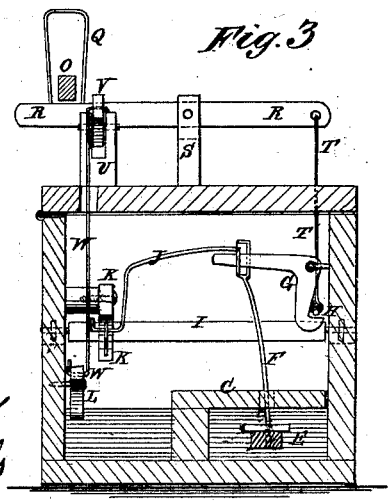
WITNESSES:
INVENTOR:
G. W. Gibson
BY
ATTORNEYS.

UNITED STATES PATENT OFFICE.

GEORGE WASHINGTON GIBSON, OF SHELBYVILLE, KENTUCKY.

IMPROVEMENT IN ANIMAL-TRAPS.

Specification forming part of Letters Patent No. 184,772, dated November 28, 1876; application filed September 30, 1876.

*To all whom it may concern:*

Be it known that I, GEORGE WASHINGTON GIBSON, of Shelbyville, in the county of Shelby and State of Kentucky, have invented a new and useful Improvement in Animal-Traps, of which the following is a specification:

In the accompanying drawing, Figure 1 is a top view of my improved trap, part being taken away to show the construction. Fig. 2 is a vertical longitudinal section of the same, taken through the line X X, Fig. 1; and Fig. 3 is a vertical cross-section of the same, taken through the line Y Y, Fig. 1.

Similar letters of reference indicate corresponding parts.

The object of this invention is to furnish an improved animal-trap, which shall be so constructed that there may be nothing to alarm the animal as he enters the trap, that will lock the animal in as he attempts to reach the bait, and that will reset itself as the animal passes into the cage or inner chamber.

The invention consists in the combination of the drop, the lever, the connecting-rods, the three catches, and the spring with the box and pivoted door of the trap, for closing the said door; and in the combination of the rod, the three levers, and the two connecting-rods with the spring that closes the pivoted door, and with the lever-catch that locks the said door when closed, for resetting the trap, as hereinafter fully described.

In the drawing, A represents the box of the trap, the lower part of the forward end of which is cut away, as shown in Fig. 2, so that the animal may see a clear space upon both sides as he first steps upon the bottom of the trap. B is an inclined platform, up which the animal walks to the raised platform C, the part of which next the partition $a^1$, that separates the inner chamber or cage from the rest of the trap, is cut away to receive the drop D. The drop D moves up and down upon guide-pins $d'$, attached to the bottom of the box A, and which pass through holes in its corners. To the center of the lower side of the trap D is pivoted the rear end of a lever, E, the middle part of which is pivoted to a short stud attached to the bottom of the box A. To the other or forward end of the lever E is attached the lower end of a rod, F, which passes up through a hole in the raised platform C, and its upper end is attached to the end of the long arm of the bent-lever catch G, which is pivoted at its angle to the side of the box A, in such a position that its short or catch arm may project downward along the side of the said box, to receive and support the spring H, by which the rear end of the pivoted door I is turned down or closed. The long arm of the lever-catch G is connected by a rod, J, with the long arm of the bent-lever catch K, which is pivoted to the side of the box A in such a position as to catch upon and hold the rear end of the pivoted door I when raised. The forward end of the lever E is weighted, so that its weight, in connection with the weight of the long arms of the lever-catches G K, may hold the said catches forward to catch upon and hold the said spring and door when raised, and may hold the drop D raised in such a way that the least pressure upon the said drop will depress it and withdraw the said catches. The upper part of the partition $a^1$ is cut away to receive the bait-box, the forward side of which is a grate, and the bottom of which is inclined toward said grate, so that the bait may be seen by the animal as he enters the trap. The pivoted door I is locked, when closed, by a lever-catch, L, pivoted to the side of the box A. As the door I closes the animal becomes frightened, and seeing light through the passage leading into the inner chamber or cage, he enters said passage, raises the hanging gate M, passes through, and is securely caged. With the hanging gate M is connected the lower end of a rod, N, which passes up through a hole in the top of the box A, and its upper end is attached to the rear end of a lever, O. The lever O is pivoted to a stud, P, attached to the top of the box A. The forward end of the lever O passes through a guide-loop, Q, attached to the upper side of the end of the lever R, which is pivoted to a stud, S, attached to the middle part of the top of the box A. To the other end of the lever R is attached a rod, T, that passes down through a hole in the top of the box A, and is attached to the free end of the spring H, so that the rise of the hanging gate M may raise the spring H and allow the door I to open into a horizontal position by its own weight. To a stud, U, attached to the top of the box A is pivoted a lever, V, the forward end of which passes beneath the end of the lever R, so that it may be operated by the operation of the said lever R. To the other end of the lever V is attached the end of a rod, W, that passes down through a hole in the top of the box A, and its lower end is attached to the end of the lever-catch L, so that the said catch L may be withdrawn and the door I released at the same time that the spring H is raised from it. In the rear end of the box A is formed a door, $a^2$, opening into the inner chamber or cage, and provided with wire-gauze to admit light. In the top of the box A are formed doors $a^3$ $a^4$, to give access to the interior of said box.

Having thus described my invention, I claim as new and desire to secure by Letters Patent—

1. The combination of the drop D, the lever E, the connecting-rods F J, the three catches G K L, and the spring H with the box A and the pivoted door I, substantially as and for the purpose herein shown and described.

2. The combination of the door M, rod N, levers O R V, and the connecting-rods T W with the spring H, pivoted door I, and lever-catch L, substantially as and for the purpose herein shown and described.

GEORGE WASHINGTON GIBSON.

Witnesses:
    JAS. D. MIDDLETON,
    CLARENCE CALDWELL.